United States Patent
Rebholz et al.

(10) Patent No.: US 10,824,673 B2
(45) Date of Patent: Nov. 3, 2020

(54) COLUMN STORE MAIN FRAGMENTS IN NON-VOLATILE RAM AND THE COLUMN STORE MAIN FRAGMENTS ARE MERGED WITH DELTA FRAGMENTS, WHEREIN THE COLUMN STORE MAIN FRAGMENTS ARE NOT ALLOCATED TO VOLATILE RANDOM ACCESS MEMORY AND INITIALIZED FROM DISK

(71) Applicant: SAP SE, Walldorf (DE)

(72) Inventors: Oliver Rebholz, Siebeldingen (DE);
Ivan Schreter, Malsch (DE);
Abdelkader Sellami, Heidelberg (DE);
Daniel Booss, Wiesloch (DE); Gunter Radestock, Karlsruhe (DE); Peter Bumbulis, Cambridge (CA); Alexander Boehm, Schwetzingen (DE); Frank Renkes, Rauenberg (DE); Werner Thesing, Lautertal (DE); Thomas Willhalm, Sandhausen (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/695,621

(22) Filed: Sep. 5, 2017

(65) Prior Publication Data
US 2018/0246809 A1   Aug. 30, 2018

(30) Foreign Application Priority Data

Feb. 28, 2017  (IN) .............................. 201741007010

(51) Int. Cl.
*G06F 16/901* (2019.01)
*G06F 3/06* (2006.01)

(52) U.S. Cl.
CPC ............ *G06F 16/901* (2019.01); *G06F 3/061* (2013.01); *G06F 3/0647* (2013.01); *G06F 3/0685* (2013.01)

(58) Field of Classification Search
CPC ........... G06F 12/0246; G06F 17/30292; G06F 3/0679; G06F 16/901; G06F 3/0647;
(Continued)

(56) References Cited

U.S. PATENT DOCUMENTS 5,630,114 A * 5/1997 Serra ................. G06F 16/24528
6,079,029 A   6/2000 Iwatani et al.
(Continued)

OTHER PUBLICATIONS

Khanse, Anad. Enable, Disable Disk Write Caching in Windows 10/8/7. [online]. The Windows Club, Jan. 15, 2013. [retrieved on Sep. 6, 2018]. Retrieved from the Internet: <URL: https://www.thewindowsclub.com/enable-disable-disk-write-caching-windows-7-8> (Year: 2013).*

(Continued)

*Primary Examiner* — William B Partridge
*Assistant Examiner* — Chie Yew
(74) *Attorney, Agent, or Firm* — Buckley, Maschoff & Talwalkar LLC

(57) ABSTRACT

A system includes a non-volatile random access memory storing a column store main fragment of a column of a database table, and a processing unit to read the column store main fragment from the non-volatile random access memory. A volatile random access memory storing a column store delta fragment of the column of the database table may also be included, in which the processing unit is to write to the column store delta fragment. According to some systems, the stored column store main fragment is byte-ad-
(Continued)

dressable, and is copied from the volatile random access memory to the non-volatile random access memory without using a filesystem cache.

21 Claims, 10 Drawing Sheets

(58) Field of Classification Search
CPC ... G06F 3/0685; G06F 3/061; G11C 11/5628; G11C 16/10; G11C 16/0483
See application file for complete search history.

(56) References Cited

U.S. PATENT DOCUMENTS

| | | | |
|---|---|---|---|
| 8,549,533 B2 | 10/2013 | Kanso et al. | |
| 9,104,665 B1* | 8/2015 | Bik | G06F 16/00 |
| 9,128,762 B2* | 9/2015 | Hulbert | G06F 12/1009 |
| 2008/0104319 A1* | 5/2008 | Hu | G06F 12/023 |
| | | | 711/113 |
| 2009/0106221 A1 | 4/2009 | Meyerzon et al. | |
| 2009/0106235 A1 | 4/2009 | Tankovich et al. | |
| 2009/0222823 A1 | 9/2009 | Parkinson et al. | |
| 2010/0169602 A1* | 7/2010 | Hulbert | G06F 12/0246 |
| | | | 711/165 |
| 2010/0235335 A1* | 9/2010 | Heman | G06F 16/23 |
| | | | 707/703 |
| 2011/0231713 A1* | 9/2011 | Takada | G06F 12/0246 |
| | | | 714/54 |
| 2012/0323923 A1* | 12/2012 | Duan | G06F 16/24554 |
| | | | 707/741 |
| 2013/0067174 A1 | 3/2013 | Moss et al. | |
| 2013/0117528 A1* | 5/2013 | Thomsen | G06F 16/188 |
| | | | 711/173 |
| 2014/0133228 A1* | 5/2014 | Sprouse | G11C 11/5642 |
| | | | 365/185.09 |
| 2014/0310232 A1* | 10/2014 | Plattner | G06F 16/24539 |
| | | | 707/602 |
| 2014/0351506 A1* | 11/2014 | Santry | G06F 3/0619 |
| | | | 711/114 |
| 2015/0178305 A1* | 6/2015 | Mueller | G06F 17/30129 |
| | | | 707/693 |
| 2015/0234719 A1 | 8/2015 | Coronado et al. | |
| 2015/0278019 A1 | 10/2015 | Fagiano et al. | |
| 2015/0355981 A1* | 12/2015 | Booss | G06F 11/1474 |
| | | | 707/674 |
| 2015/0378822 A1 | 12/2015 | Grube et al. | |
| 2016/0004552 A1 | 1/2016 | Innan et al. | |
| 2016/0125021 A1* | 5/2016 | Birka | G06F 16/23 |
| | | | 707/692 |
| 2016/0162541 A1* | 6/2016 | Hill | G06F 17/30424 |
| | | | 707/722 |
| 2016/0267102 A1* | 9/2016 | Klein | G06F 17/30132 |
| 2017/0147208 A1* | 5/2017 | Shu | G06F 3/061 |

OTHER PUBLICATIONS

Oukid, Ismail et al. "Instant Recovery for Main-Memory Databases", 7th Biennial Conference on Innovative Data System Research (CIDR'15), Jan. 4-7, 2015, Asilomar, California, USA, 9pgs.
Oukid, Ismail et al. "SOFORT: A Hybrid SCM-DRAM Storage Engine for Fast Data Recovery", DaMON'14, Jun. 22-27, 2014, Snowbird, UT, USA, ACM 978-1-4503-2971-2/14/06, http://dx.doi.org/10.1145/2619228.2619236, 7pgs.

* cited by examiner

COLUMN STORE MAIN FRAGMENTS IN NON-VOLATILE RAM AND THE COLUMN STORE MAIN FRAGMENTS ARE MERGED WITH DELTA FRAGMENTS, WHEREIN THE COLUMN STORE MAIN FRAGMENTS ARE NOT ALLOCATED TO VOLATILE RANDOM ACCESS MEMORY AND INITIALIZED FROM DISK

CROSS-REFERENCE TO RELATED APPLICATIONS

This application is related to, and claims benefit of and priority to, Indian Provisional Patent Application No. 201741007010, filed Feb. 28, 2017, the contents of which are hereby incorporated by reference in their entirety for all purposes.

BACKGROUND

Non-Volatile Memory (NVM) provides an intermediate alternative between high-performance Dynamic Random Access Memory (DRAM) and persistent storage such as hard disk drives (HDDs). Generally, the read and write performance of NVM is similar to DRAM and significantly faster than HDDs. It is desirable to efficiently incorporate the advantages of NVM into conventional database systems while abating the disadvantages thereof.

DETAILED DESCRIPTION

The following description is provided to enable any person in the art to make and use the described embodiments. Various modifications, however, will remain readily-apparent to those in the art.

Generally, some embodiments utilize NVM to store column store main fragments of an in-memory column-store database. Column store main fragments are primarily subjected to read operations and, as mentioned above, the read performance of NVM rivals that of DRAM. Additionally, NVM data remains in memory during power cycling, so column store main structures may be accessed directly after a crash and restart. In contrast, a database system would remain offline after a restart until all database data is read from hard disk and written into DRAM.

The write performance of NVM is currently slower than that of DRAM. However, column store main fragments are written to during delta merges, which occur infrequently (e.g., once per day per table). Accordingly, the slower write time compared to DRAM should have little effect on overall system performance. Infrequent writing also prolongs the operational life of the NVM, which might not exhibit the endurance of DRAM to writes over time.

As will be described in detail below, each column in a columnar data store may be logically split into a delta structure and a main structure. These structures will be referred to herein as column store delta fragments and column store main fragments, respectively. The column store delta fragment of a column may be optimized for read and write access in disk and in memory, while the column store main fragment may be optimized for read access in disk and memory. According to some embodiments, each column store main fragment is associated with an NVM block which stores large memory allocations of the column store main fragment. Thus, when a column store main fragment is loaded into memory, its large data structures are not allocated in DRAM and initialized from disk as in some conventional in-memory systems. Instead, the column store main fragment being loaded locates its associated NVM block and points directly to its column vector and dictionary backing arrays.

Figure 1:
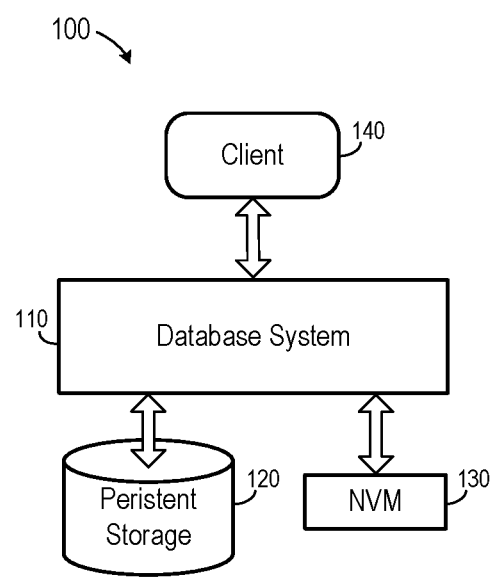
FIG. 1 is a block diagram of a system according to some embodiments.

FIG. 1 is a block diagram of system 100 according to some embodiments. System 100 includes database system 110, persistent storage 120, NVM 130, and client 140. According to some embodiments, database system 110, persistent storage 120 and NVM 130 may operate to serve transactional and analytical data to client 140 based on requests received therefrom.

Database system 110 may comprise any query-responsive database system that is or becomes known, including but not limited to a structured-query language (i.e., SQL) relational database management system. Database system 110 generally provides data to reporting clients, such as client 120, in response to instructions (e.g., SQL statements) received therefrom. In some embodiments, database system 110 receives an instruction from client 120. Database system 110 generates a statement execution plan based on the instruction and on stored metadata describing the data of the database. The statement execution plan is forwarded to storage layer of database system 110, which executes the plan and returns a corresponding dataset. Database system 110 then returns the dataset to client 120. Embodiments are not limited thereto.

Database system 110 may comprise an "in-memory" database, in which Random Access Memory is used as a cache and for storing the full database during operation. According to some embodiments, DRAM may be used to store portions of the full database during operation, while NVM 130 is used to store other portions of the full database during operation. As mentioned above, the portions stored by NVM 130 need not be reloaded after a database restart. If the portions stored by NVM 130 include the column store main fragments of the database, as described herein, the database is available in memory for reading after a restart without requiring the loading of such structures into DRAM from storage 120.

The data of database system 110 comprises column-based data stored in columnar format and may also include one or more of conventional tabular data, row-based data stored in row format, and object-based data. Moreover, the data of database system 110 may be indexed and/or selectively replicated in an index to allow fast searching and retrieval thereof.

Persistent storage 120 may comprise one or more non-volatile data storage units (e.g., fixed disks) storing relational data, multi-dimensional data, an eXtendable Markup Language (i.e., XML) document, or any other structured and/or unstructured data. Persistent storage 120 may also store log volumes, data backups, and/or other suitable data. The data of persistent storage 120 may be distributed among several non-volatile data storage units. Embodiments are not limited to any number or types of non-volatile data storage units.

NVM 130 may be implemented using flash-based memory connected to a processor vie PCIe interconnect technology, but other variants are known, including but not limited to 3D XPoint, Phase-change Random Access Memory, Magnetic Random Access Memory, and Memristors. NVM 130 may exhibit a Dual In-Line Memory Module (i.e., DIMM) form-factor or other form-factor and may interface with a Central Processing Unit (i.e., CPU) of database system 110 as RAM (e.g., byte-addressable, directly accessible using load/store instructions, and covered by CPU cache-line handling, including cross-socket cache coherency) rather than as a block device. According to some implementations, the device latency of NVM 130 is close to that of DRAM and its bandwidth lower than that of DRAM.

Client 120 may comprise one or more devices executing program code of a software application for presenting user interfaces to allow interaction with data server 130. Presentation of a user interface may comprise any degree or type of rendering, depending on the type of user interface code generated by database system 110. For example, client 120 may execute a Web Browser to receive a Web page (e.g., in HTML format) from database system 110, and may render and present the Web page according to known protocols. Client 120 may also or alternatively present user interfaces by executing a standalone executable file (e.g., an .exe file) or code (e.g., a JAVA applet) within a virtual machine.

Although embodiments are described with respect to system 110, which reflects "single node" database system, embodiments may also be implemented within one or more nodes of a distributed database, each of which comprises an executing process, a cache and a datastore. The data stored in the datastores of each node, taken together, represent the full database, and the database server processes of each node operate to transparently provide the data of the full database to the aforementioned database applications. System 110 may also or alternatively support multi-tenancy by providing multiple logical database systems which are programmatically isolated from one another.

Database dictionary compression will now be described. Database tables include several values for each database record. The memory required to store the values may be reduced by storing smaller value IDs instead of the values themselves. In order to facilitate such storage, a dictionary is used which maps values into value IDs. Each unique value in the dictionary is associated with one unique value ID. Therefore, when a particular value is to be stored in a database record, the value ID for the value is determined from the dictionary and the value ID is stored in the record instead. To quickly determine rows containing a dictionary value, a secondary structure, or dictionary index, may be used. The dictionary index may be, for example, a hash map or tree-based map from value to value ID.

Figure 2A:
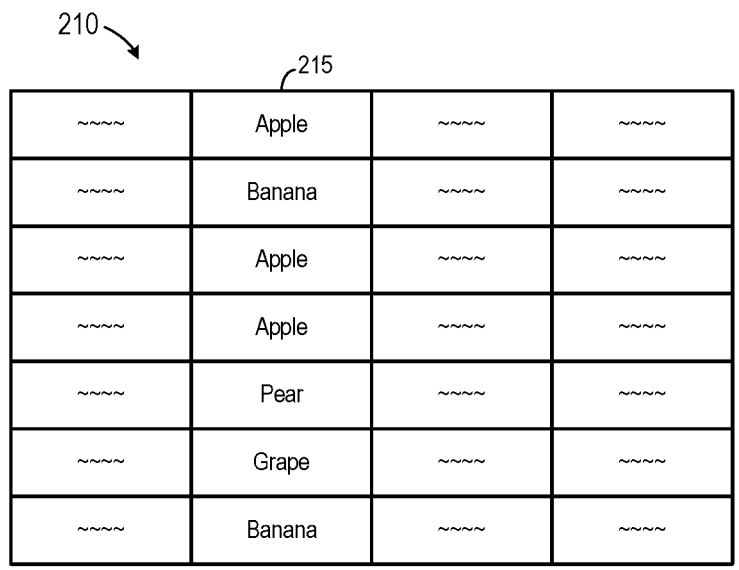
FIG. 2A illustrates a database table according to some embodiments.
Figure 2B:
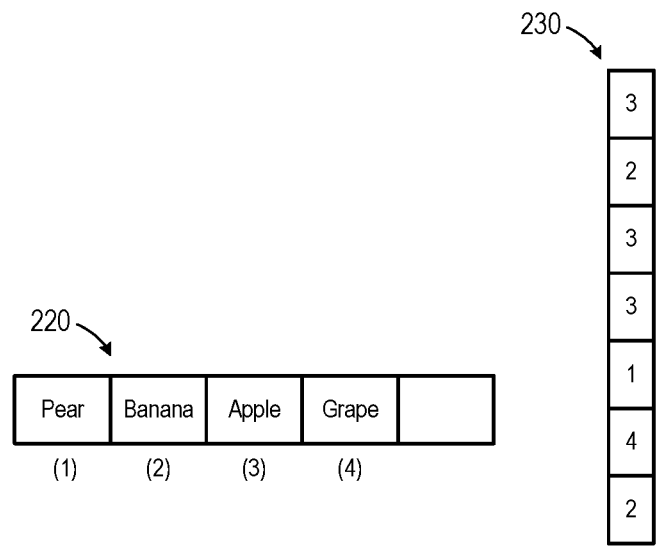
FIG. 2B illustrates a data dictionary and a column vector according to some embodiments.

FIG. 2A illustrates table 210 according to some embodiments. Table 210 includes four columns, each of which includes various values. Dictionary 220 of FIG. 2B is associated with column 215 and used for encoding the values of column 215. Each vector element at position i of dictionary 220 stores the value associated with value ID i. That is, value "Pear" is associated with value ID 1, value "Banana" is associated with value ID 2, etc.

Vector 230 represents column 215 after being encoded based on dictionary vector 220. Specifically, each occurrence of value "Pear" has been replaced by value ID 1, each occurrence of value "Banana" has been replaced by value ID 2, each occurrence of value "Apple" has been replaced by value ID 1, and each occurrence of value "Grape" has been replaced by value ID 4. Storage of the values of vector 230 requires less storage space than storage of the values of column 215, and the stored values of vector 230 are more amenable to compression.

A sorted dictionary is suitable for storage of columnar data (e.g., since it supports direct binary search and does not require the overhead of a dictionary index) and reading of columnar data (e.g., since range queries are executed directly on integer value encodings, rather than actual domain's value lookup). Conversely, a sorted dictionary is not ideal for inserting new values into columnar data (e.g., since new values do not arrive in order and the dictionary would therefore require constant re-sorting).

To address this conflict, some embodiments store two "fragments" per columnar table. The "main" table fragment is reader-friendly and the "delta" table fragment is writer-friendly. Each table fragment is stored using a different storage organization. According to some embodiments, the main table fragment contains all the data stored within the table, and is stored using a sorted dictionary and advanced compression. The delta table fragment contains newly-written data which has not yet been merged into the main table fragment, and is stored using a non-sorted dictionary and N-bit compression. All new data is inserted into the delta table fragment, and the data of the main table fragment changes only during merges and other data reorganization processes.

According to some embodiments, snapshot isolation is implemented for both the main and the delta table fragments using Multi-Version Concurrency Control (i.e., MVCC) structures. Queries access both table fragments, and fragment deletion is a logical operation.

Figure 3:
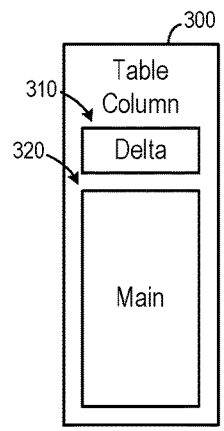
FIG. 3 illustrates a column store delta fragment and a column store main fragment of a database table column according to some embodiments.

A main table fragment of a table includes a column store main fragment for each table column, and a delta table fragment of a table includes a column store delta fragment for each table column. A column store main fragment for a table column includes all the data of that column (or, if partitioned, of that columnar partition), and the delta table fragment for the table column contains newly-written data of the column which has not yet been merged into the column store main fragment. FIG. 3 illustrates column store delta fragment 310 and column store main fragment 320 associated with table column 300.

Large tables may be physically partitioned (e.g., by hash, by range, etc.). For a table composed of m columns and n partitions, each column is associated with n column store main fragments and n column store delta fragments. Accordingly, the table is associated with m x n column store main fragments and m x n column store delta fragments.

As described above, new column store main fragments are created by delta merge operations according to some embodiments. For example, a delta table fragment is merged into its associated main table fragment if it is determined that the delta table fragment has reached (or is about to reach) a predetermined threshold size. The threshold size may be statically or dynamically-configured, and may be table and/or partition-specific. The delta merge process is non-blocking to readers and writers, except for two short time windows at either end of the merge process.

Figure 4:
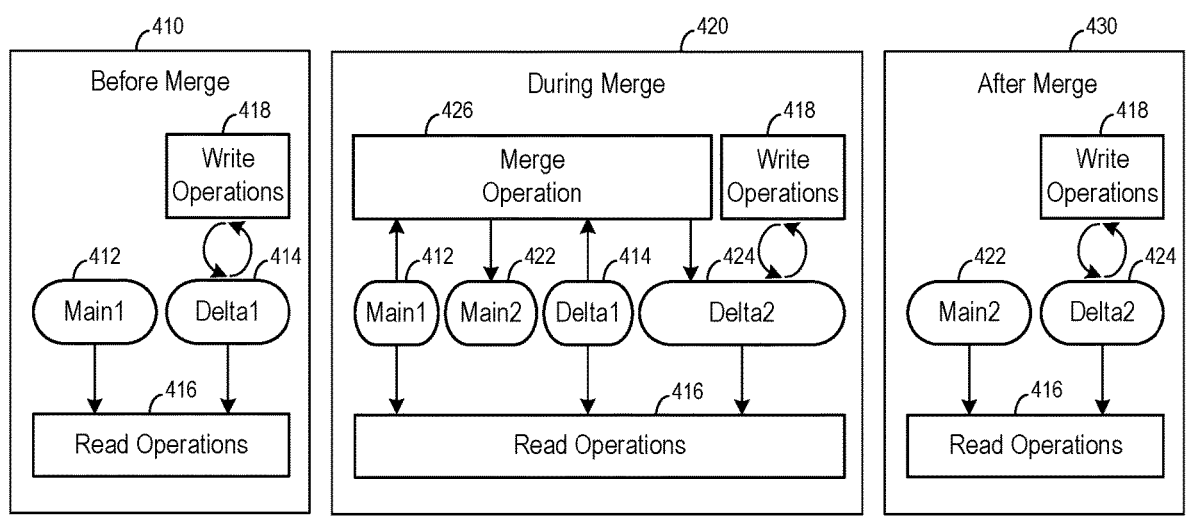
FIG. 4 illustrates a fragment merge operation according to some embodiments.

During a delta merge of a table, new column store main fragments and column store delta fragments are created for each column of the table. FIG. 4 illustrates the delta merge process for a particular column according to some embodiments. Box 410 illustrates runtime operation prior to the delta merge. As shown, column store main fragment 412 and column store delta fragment 414 each serve incoming read operations 416, and write operations 418 are served by column store delta fragment 414.

Box 420 illustrates the merge process according to some embodiments. Merge operation 426 creates new empty column store delta fragment 424 and directs write operations 418 thererto. Merge operation 426 also reads column store main fragment 412 and column store delta fragment 414 and creates new column store main fragment 422 based thereon. Read operations 416 are served during this time by column store main fragment 412, column store delta fragment 414, and column store delta fragment 424.

Upon success of the merge, as illustrated in box 430, column store main fragment 412 and column store delta fragment 414 are dropped. New column store delta fragment 424 contains only rows inserted during the merge. New column store main fragment 422 contains the data from column store main fragment 412 and column store delta fragment 414. If the delta merge is determined to have failed, the system reverts to column store main fragment 412 and column store delta fragment 414.

Received Data Definition Language statements (DDLs) may result in creation of a new column, dropping of an existing column, or alteration of an existing column. New main and column store delta fragments are created for new columns, and main and column store delta fragments associated with dropped columns are logically deleted. For certain DDLs that alter an existing column (e.g., changes to the data type of a column), new associated main and column store delta fragments are created. For other DDLs that alter an existing column (e.g., specification of a new default value for the column on inserts to the table), the delta and column store main fragments associated with the column might not change.

Figure 5:
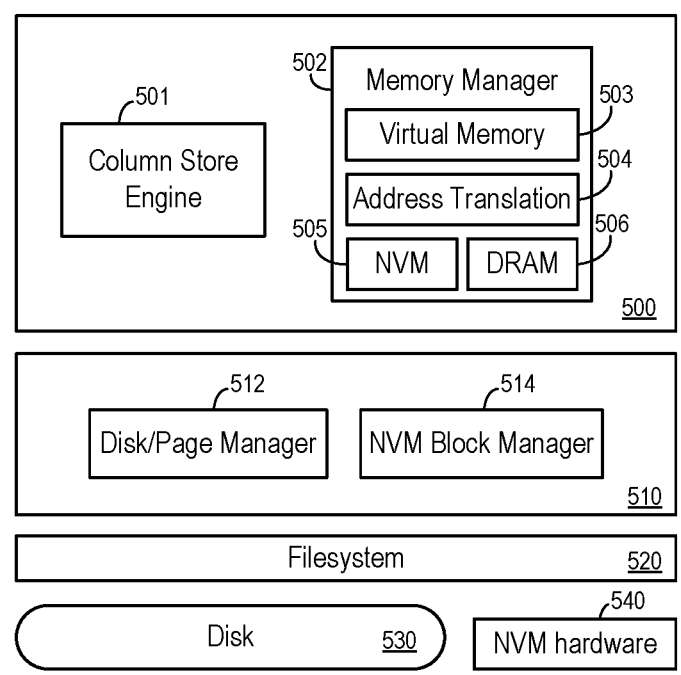
FIG. 5 is a block diagram of a database architecture according to some embodiments.

FIG. 5 is a block diagram of an implementation of a database system 110, persistent storage 120 and NVM 130 of FIG. 1 according to some embodiments. Embodiments are not limited to the illustrated elements of FIG. 5. The illustrated elements may be implemented by any suitable combinations of hardware and software as is known in the art. Such combinations may include one or more processing units (microprocessors, central processing units, microprocessor cores, execution threads), one or more non-transitory storage media, and processor-executable software code.

System 500 includes column store engine 501. Column store engine 501 stores tabular data of a database as is known in the art. Data may be retrieved from column store engine 501 by upper layers of system 500 (not shown) in response to received queries. Received DDLs may be handled by creating, deleting or altering a column of column store engine 501.

Column store engine 501 includes in-memory representations of column store delta fragments and column store main fragments according to some embodiments. According to some embodiments, new column store main fragments are constructed by column store engine 501, persisted to NVM (if appropriate) 505/540, and read therefrom by column store engine 501.

Column store engine 501 uses memory manager 502 to retrieve data from NVM 505 and DRAM 506. According to some embodiments, NVM 505 is used to store larger structures of the column store main fragments, such as the dictionary and column vector backing arrays. Each column store main fragment is associated with an NVM block containing its data. In some embodiments, smaller intermediate data structures (e.g., row counts of most-common values, access and usage statistics, bit vector of null values) of column store main fragments are allocated in DRAM 506. All delta and MVCC data structures, as well as intermediate results of query processing, may be allocated in DRAM 506.

Each time the database starts, all the memory allocations (including those of the NVM blocks) are mapped to different addresses of virtual memory 503 via address translation 504. Since any pointer persisted in NVM would therefore need to be remapped after such a restart, some embodiments do not persist pointers in NVM. Notably, the large memory allocations stored in NVM according to some embodiments typically consist of the leaves of the column store main fragments, and therefore do not include any pointers.

Persistence layer 510 include disk/page manager 512 to control a disk-based filesystem 520 for writing to and reading from data volumes and log volumes stored on disk 530. Similarly, persistence layer 510 includes NVM block manager 514 to control an NVM-based filesystem to manage NVM blocks of NVM hardware 540 used to store columnar data. NVM 505 and NVM hardware 540 represent the same physical hardware and the separate depiction in FIG. 5 is intended to illustrate a conceptual relationship. Specifically, the relation is that NVM "files" 505 are mapped into the virtual memory 503 when the NVM blocks are loaded, and the contents of the NVM files are stored in NVM 540.

According to some embodiments, the implementation model of NVM Block Manager 514 is based on a root directory of the mounted filesystems. The root directory may be the location at which the persistent memory devices (i.e., DIMMs) are mounted. The physical location may be DAX (i.e., Direct Access)-enabled, which is an Operating System feature added for persistent memory storage. If supported, the DAX bypasses the kernel page cache (i.e., filesystem cache) which is usually used to buffer reads/writes into files.

For file-based mappings, the persistent memory space is mapped directly into virtual memory 503. All the NVM-resident blocks are stored under the root directory and, at startup, these blocks are loaded from the same fixed directory.

Figure 6:
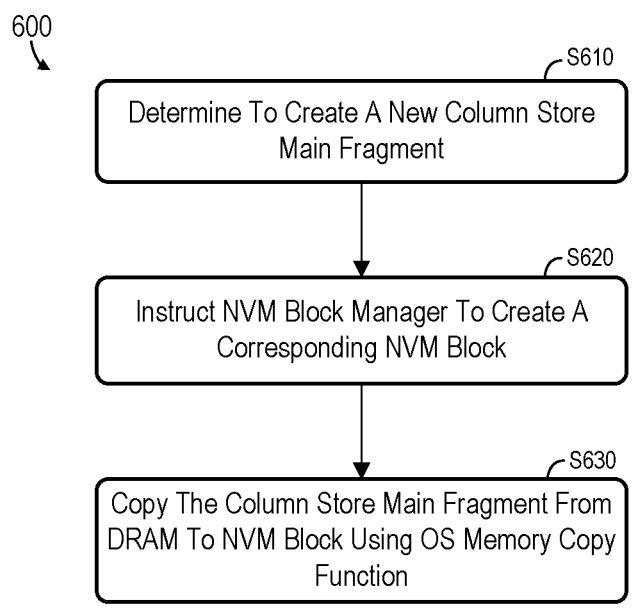
FIG. 6 comprises a flow diagram of a process to create a column store main fragment in NVM according to some embodiments.

FIG. 6 comprises a flow diagram of process 600 to create a column store main fragment and its associated NVM block according to some embodiments. In some embodiments, various hardware elements execute program code to perform process 600. Process 600 and all other processes mentioned herein may be embodied in processor-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

A determination to create a new column store main fragment is made at S610. The determination may be based on an existing delta merge operation (e.g., column store main fragment 422 of FIG. 4), or from a received DDL. Next, at S620 an NVM block manager is instructed to create an NVM block in NVM which corresponds to the new column store main fragment. Finally, at S630, the column store main fragment is copied from DRAM to the created NVM block. Advantageously, the copying at S630 may use an OS-supported memory copying function (e.g., memcpy), as opposed to employing filesystem operations for writing to a disk.

During the write of the column store main fragment into NVM, descriptive data and pointers to content data may be kept in DRAM, while the pointers are switched from DRAM addresses to the corresponding addresses within the mapped NVM block, and the previous DRAM memory used for content data is freed. When writing of the NVM block is finished, the NVM block remains mapped in the virtual address space and the data is accessed directly from the NVM block during all subsequent column accesses.

For example, in order to read from a column store main fragment stored in NVM, a pointer to its NVM block is retrieved from the in-memory representation of the column store main fragment in column store 501. Memory manager 502 maps the pointer into an address of virtual memory 503 via address translation 504. This address is passed back to column store 501, which then points the index vector and dictionary of the in-memory representation of the column store main fragment directly into the NVM block.

Figure 7:
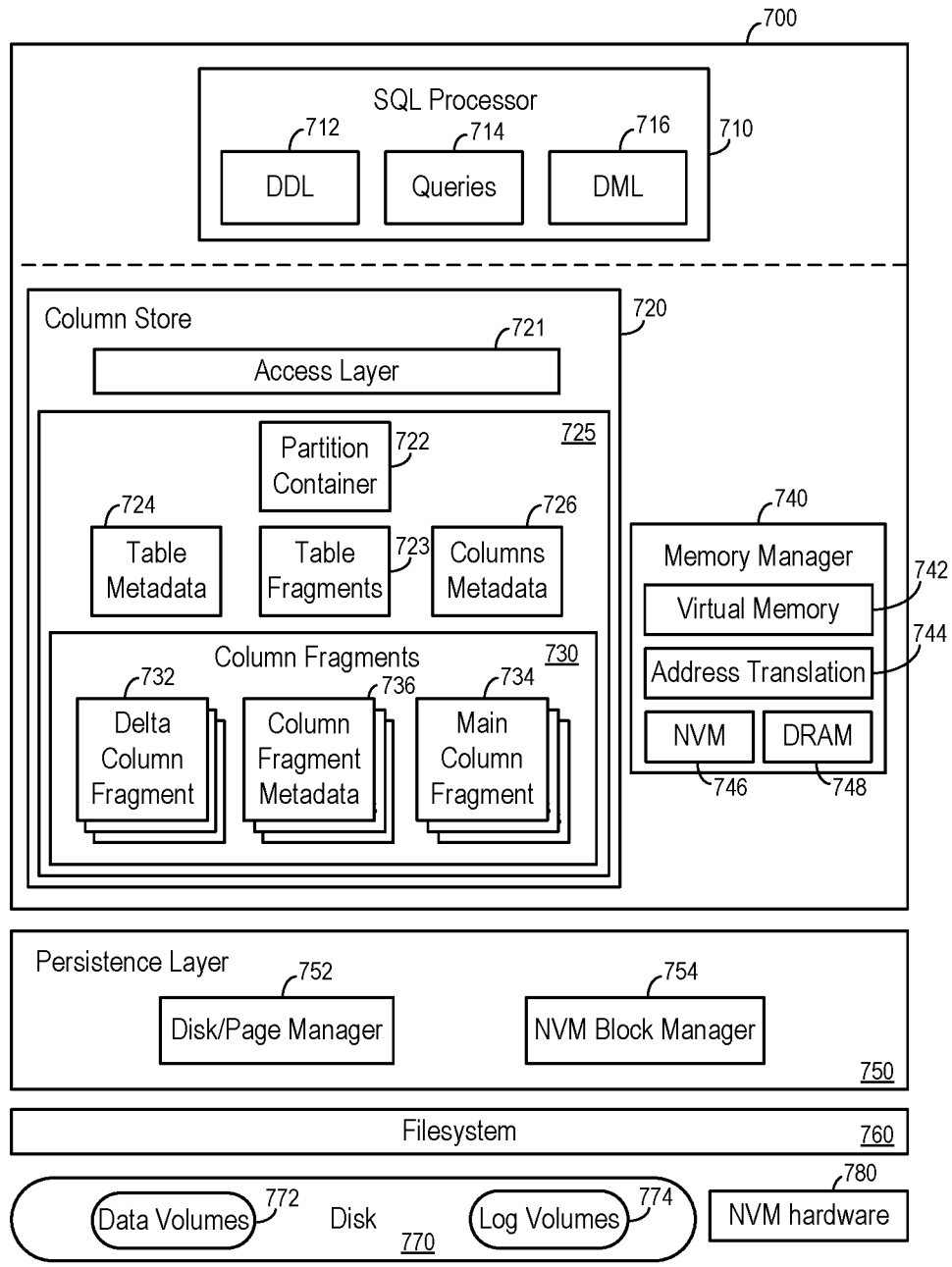
FIG. 7 is a block diagram of a database architecture according to some embodiments.

FIG. 7 is a block diagram of an implementation of a database system 110, persistent storage 120 and NVM 130 of FIG. 1 according to some embodiments. Embodiments are not limited to the illustrated elements of FIG. 7.

System 700 includes SQL processor 710, which receives SQL statements from one or more client systems as is known in the art (not shown). The SQL statements may include DDL statements, queries, and Data Manipulation Language statements, which may be handled by modules 712, 714 and 716, respectively. System 700 also includes a Persistence Layer 750, including a Disk/Page Manger 752 and NVM Block Manager 754. The system 700 further includes a file system 760, and NVM hardware 780. The disk 770, described below, includes data volumes 772 and log volumes 774.

Column store 720 includes access layer 721 and store layer 725. Access layer 721 operates to retrieve data as defined by store layer 725. Access layer 721 includes in-memory representations of column store delta fragments and column store main fragments according to some embodiments. According to some embodiments, new column fragments are constructed by access layer 721 and persisted to NVM if appropriate.

A stored table may include one or more partitions as described above. Each partition is associated with a persisted container 722 of store layer 725. Within each container 722 are table fragments 723 (i.e. a delta table fragment and a main table fragment) for the associated table partition. Further, each table fragment 723 contains corresponding column store delta fragments 732 and column store main fragments 734.

Partition containers 722 may be identified by a unique identifier, e.g., a unique numeric or alphanumeric value. The table fragments 723 within a partition container 722 are also uniquely identified, as are the column fragments 732 and 734 which are associated therewith. In this regard, table metadata 724 may include a persistent table descriptor specifying, for each table partition, the partition number, the table name, the table identifier, etc. Columns metadata 726 may include a persistent column descriptor specifying, for each column of a table partition, a column identifier, a column name, a column type, an NVM-enabled flag, etc.

Each column store main fragment 734 may be represented by a persistent column fragment descriptor and a paired transient object in column fragment metadata 736. The persistent descriptor may specify the column fragment's row count, table fragment identifier, column identifier, data and dictionary page chains, and may refer to other persistent descriptors through persistent pointers. The paired transient object points to the persistent column fragment descriptor, enriches the persistent column fragment descriptor's functionality and state, and refers to other transient objects through handles.

The persistent column fragment descriptor also specifies an NVMBlockID, which is a numeric identifier used to identify an NVM block associated with the corresponding column store main fragment. The NVMBlockID is unique for the corresponding column store main fragment. During operation as described below, a column store main fragment NVM block key may be constructed as follows: NVM Block Key ::=ContainerID '-' FragmentID '-' ColumnID '-' NVMBlockID, where ColumnID is the numeric identifier for the column, FragmentID is the numeric identifier for the main table fragment containing the column store main fragment, and ContainerID is the numeric identifier for the table partition containing the main table fragment.

Column store 720 uses memory manager 740 to retrieve data from NVM 746 and DRAM 748. When a column store main fragment is to be loaded into memory, access layer 721 requests, from store layer 725, information on whether or not the column store main fragment stores data in NVM. The column store main fragment checks its persistent column fragment descriptor to determine whether the column store main fragment is associated with an NVMBlockID. If the column store main fragment is associated with an NVMBlockID, access layer 721 requests for a pointer to the NVM block from store layer 725. Store layer 725 obtains the pointer to the NVM block via the column store main fragment, which in turn constructs the NVM block key and obtains the pointer from memory manager 740. Memory manager 740 maps the NVM block into an address of virtual memory 742 via address translation 744. This address is passed back to access layer 721, which then points the index vector and dictionary of the in-memory representation of the column store main fragment directly into the NVM block. If there is no NVM block associated with the column fragment, the in-memory index vector and dictionary are constructed by reading data from disk 770.

Figure 8:
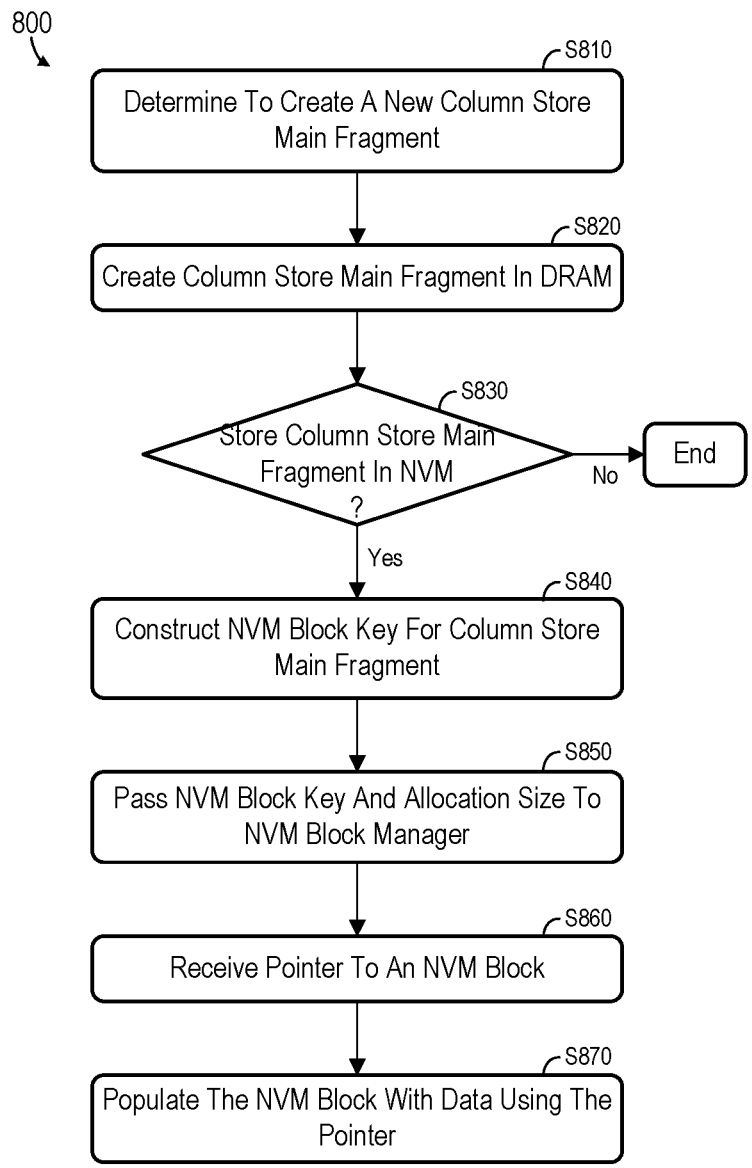
FIG. 8 comprises a flow diagram of a process to create a column store main fragment in NVM according to some embodiments.

FIG. 8 comprises a flow diagram of process 800 to create a column store main fragment and its associated NVM block according to some embodiments. Process 800 may comprise an implementation of process 600 of FIG. 6, but embodiments are not limited thereto. Process 800 will be described with respect to system 700 of FIG. 7.

Initially, at S810, it is determined to create a new column store main fragment as described above with respect to S610. The column store main fragment is created and populated in memory at S820. According to some embodiments, access layer 721 constructs a column store main fragment in DRAM 748 at S820 as part of a delta merge operation. For column store main fragments, column fragment metadata 736 includes pointers to the disk pages that contain the data that is used to reconstruct the DRAM-stored structures. For delta fragments, column fragment metadata 736 includes the same pointer to disk pages that store data and also includes pointers to the in-memory DRAM-stored structures.

Next, at S830, it is determined whether the column store main fragment is to be persisted in NVM or allocated in DRAM. According to some embodiments, access layer 721 performs this determination based on the "NVM enabled" field corresponding to the column in column metadata 726. If the determination is negative, process 800 terminates.

If it is determined that the column store main fragment is to be persisted in NVM, an NVM block key is constructed at S840. According to some embodiments, the associated in-memory column representation of access layer 721 invokes a createNvmBlock method on the associated column store main fragment 734 of column fragments 730. The column store main fragment knows the FragmentID of its owning table fragment 723, which in turn knows the ContainerID of its owning container 722. Accordingly, the NVM block key is constructed as ContainerID '-' FragmentID '-' ColumnID '-' NVMBlockID, where NVMBlockID is an incremented value of any NVMBlockID currently-associated with the column store main fragment.

The column store main fragment, at S850, passes the NVM Block Key and allocation size (in bytes) to NVM Block Manager 754 to allocate the NVM block. At S860, NVM Block Manager 754 allocates the block and returns a pointer to the block to the in-memory representation of the column store main fragment in fragment access 721. Using the pointer, the in-memory column store main fragment populates the NVM block at S870 with the data of the column store main fragment.

Figure 9:
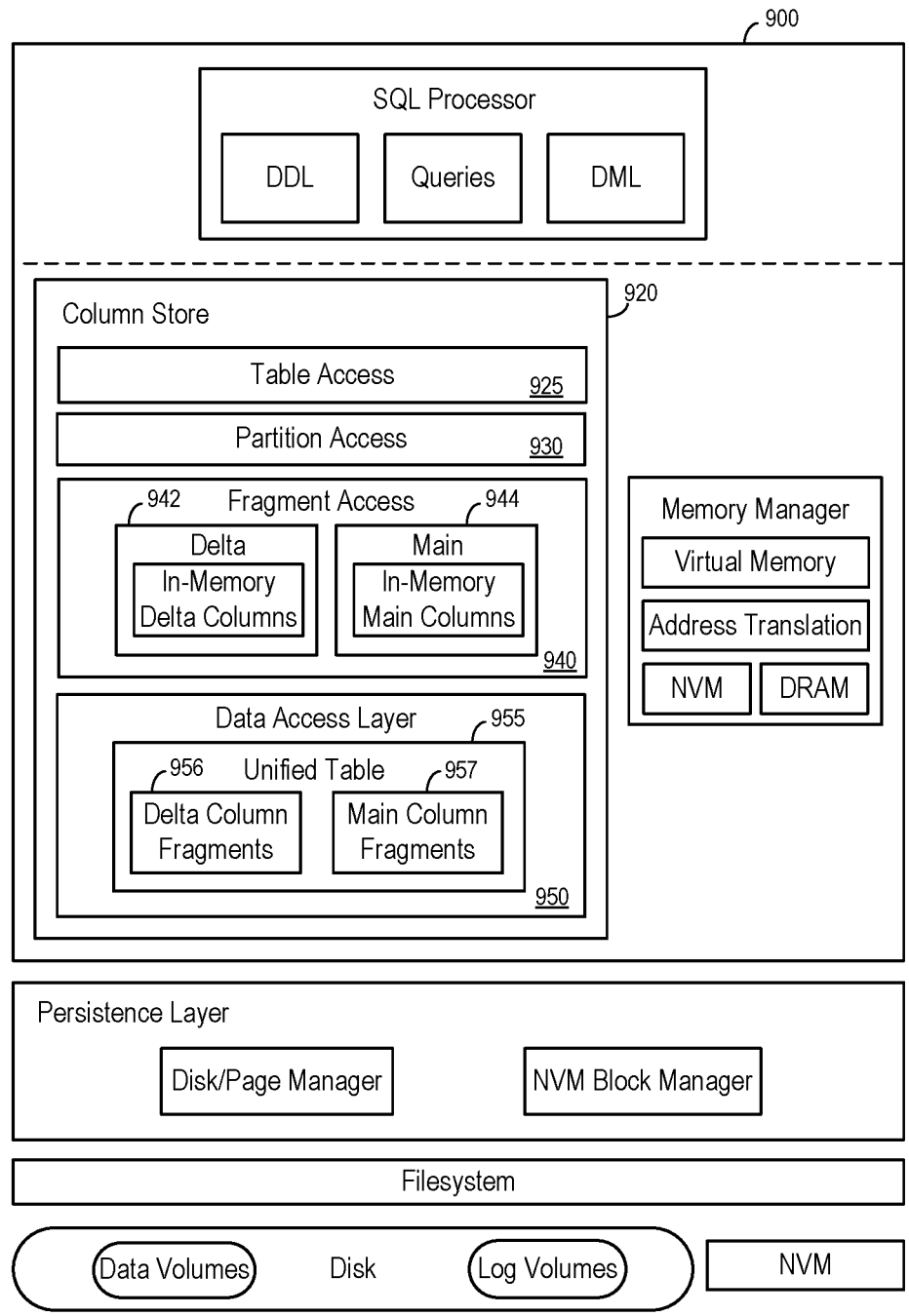
FIG. 9 is a block diagram of a database architecture according to some embodiments.

FIG. 9 is a block diagram of system 900 according to some embodiments. System 900 may comprise an implementation of system 500 of FIG. 5, system 700 of FIG. 7 and/or of database system 110, persistent storage 120 and NVM 130 of FIG. 1.

Column store 920 of system 900 provides additional detail of access layer 721 of system 700 according to some embodiments. Specifically, access layer 721 is implemented by table access 925, partition access 930 and fragment access 940. As described above with respect to access layer 721, fragment access 940 includes in-memory representations 942 of delta columns and in-memory representations 944 of main columns.

Store layer 725 of system 700 may be implemented by data access layer 950, in which unified table 955 includes column store delta fragments 956 and column store main fragments 957 as described above with respect to column store delta fragments 732 and column store main fragments 734, respectively.

Figure 10:
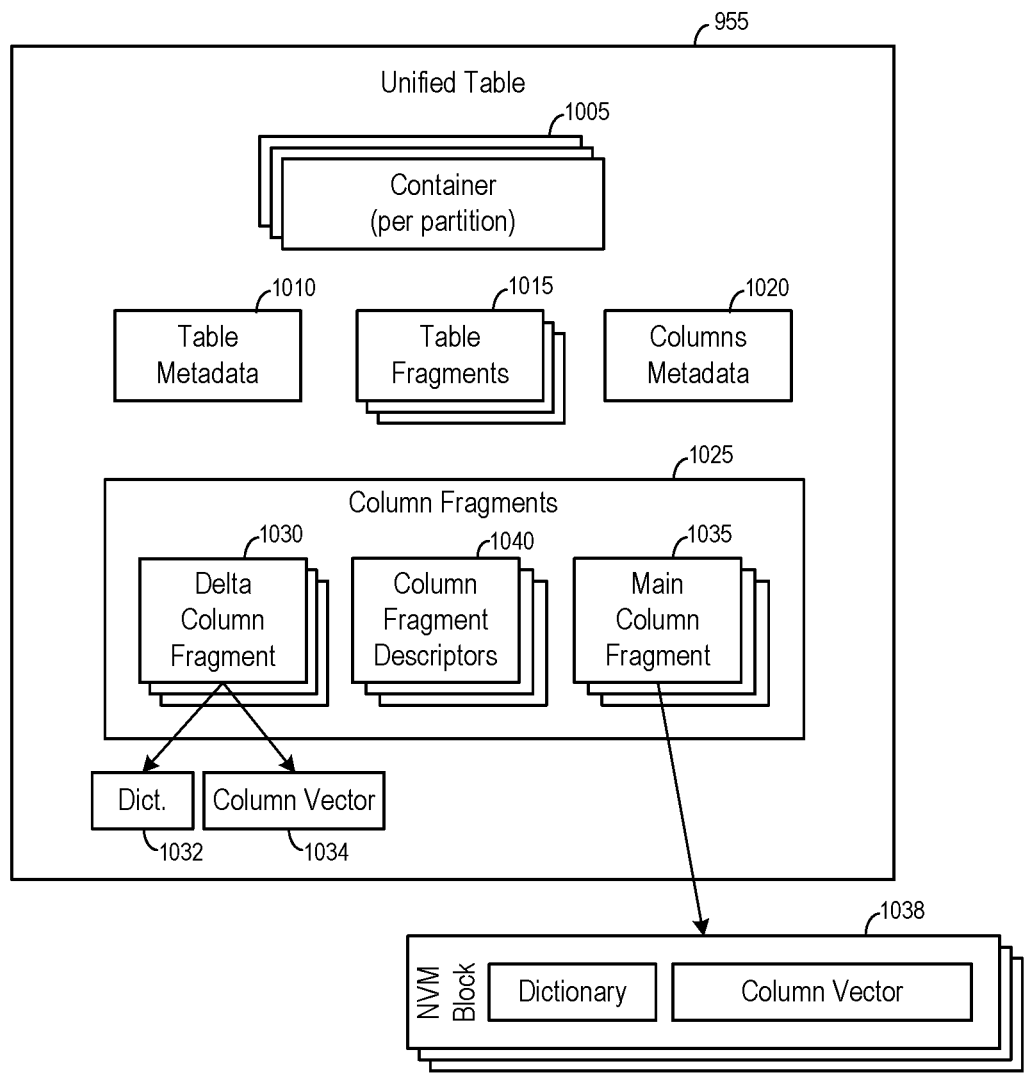
FIG. 10 is a block diagram of a portion of a database architecture according to some embodiments.

FIG. 10 is a detailed illustration of an architecture of unified table 955 according to some embodiments. FIG. 10 illustrates partition containers 1005, table metadata 1010, table fragments 1015 and columns metadata 1020, each of which may be as described above with respect to partition container 722, table metadata 724, table fragments 723 and columns metadata 726. Similarly, column fragments 1025, including column store delta fragments 1030, column store main fragments 1035 and column fragment descriptors 1040, may be implemented as described above with respect to column fragments 730, including column store delta fragments 732, column store main fragments 734 and column fragment descriptors 736, respectively. As also described above, each column store delta fragment 1030 points to its respective dictionary 1032 and column vector 1034 in DRAM, while each column store main fragment 1035 logically points to its respective NVM block 1038 (i.e., if the associated column is "NVM-enabled"), in that each column store main fragment 1035 knows how to construct an NVM block key and includes functionality to obtain a virtual address pointer to the associated NVM block 1038 (e.g., using memory manager 540 as described above). A column store main fragment 1035 is unaware of the data within its NVM block 1038, as the in-memory representation of the column store main fragment interprets the contents of the NVM block 1038.

Figure 11:
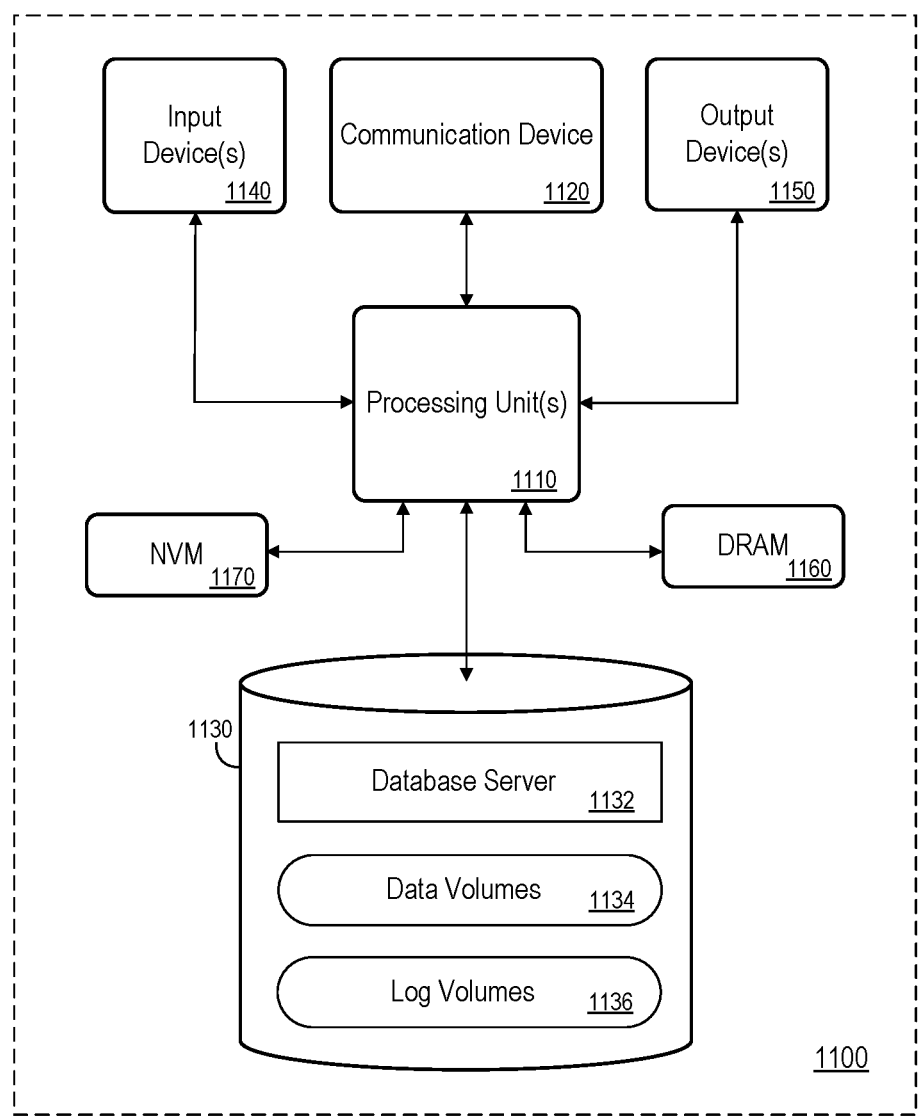
FIG. 11 is a block diagram of an apparatus according to some embodiments.

FIG. 11 is a block diagram of apparatus 1100 according to some embodiments. Apparatus 1100 may comprise a general-purpose computing apparatus and may execute program code to perform any of the functions described herein. Apparatus 1100 may comprise an implementation of system 500 of FIG. 5, system 700 of FIG. 7, system 900 of FIG. 9 and/or of database system 110, persistent storage 110 and NVM 130 of FIG. 1 in some embodiments. Apparatus 1100 may include other unshown elements according to some embodiments.

Apparatus 1100 includes processing unit(s) 1110 operatively coupled to communication device 1120, data storage device 1130, one or more input devices 1140, one or more output devices 1150 and memory 1160. Communication device 1120 may facilitate communication with external devices, such as a reporting client, or a data storage device. Input device(s) 1140 may comprise, for example, a keyboard, a keypad, a mouse or other pointing device, a microphone, knob or a switch, an infra-red (IR) port, a docking station, and/or a touch screen. Input device(s) 1140 may be used, for example, to enter information into apparatus 1100. Output device(s) 1150 may comprise, for example, a display (e.g., a display screen) a speaker, and/or a printer.

Data storage device 1130 may comprise any appropriate persistent storage device, including combinations of magnetic storage devices (e.g., magnetic tape, hard disk drives and flash memory), optical storage devices, Read Only Memory (ROM) devices, etc. Data storage device 1130 may be implemented using one or more arrays of storage devices, one or more of which may be remote from one another.

Database server 1132 may comprise program code executed by processing unit(s) 1110 to cause apparatus 1100 to perform any one or more of the processes described herein, including but not limited creating the runtime structures of FIG. 5 and/or FIG. 10 in DRAM 1160 and/or NVM 1170. Embodiments are not limited to execution of these processes by a single apparatus. Data volumes 1134 may include conventional database data and metadata as described above, while log volumes 1136 may comprise log data as is known in the art.

Data storage device 1130 may also store data and other program code for providing additional functionality and/or which are necessary for operation of apparatus 1100, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Embodiments described herein are solely for the purpose of illustration. Those in the art will recognize other embodiments may be practiced with modifications and alterations to that described above.

What is claimed is:

1. A database system comprising:
   a non-volatile random access memory operative to receive a column store main fragment that is not allocated to a volatile random access memory and initialized from disk, the non-volatile random access memory storing a column store main fragment of a column of a database table, wherein the column store main fragment contains all data stored within the column, wherein the data stored in the column store main fragment is sorted;
   the volatile random access memory storing a column store delta fragment of the column of the database table, wherein the column store delta fragment contains newly-written data which is not sorted and has not yet been merged into the column store main fragment, wherein the newly-written column store delta fragment data is sorted when contained in a second column store main fragment created by a merger operation; and a processing unit to: read the column store main fragment from the non-volatile random access memory; execute the merger operation to create the second column store main fragment, wherein the merger operation creates a second empty column store delta fragment operative to receive write operations during the merger operation; and upon success of the merger operation, the column store main fragment and the column store delta fragment are logically deleted from the database table.

2. The database system according to claim 1, wherein the processing unit is to write to the column store delta fragment.

3. The database system according to claim 1, wherein the stored column store main fragment is byte-addressable.

4. The database system according to claim 1, further comprising:
   wherein the processing unit is to create the second column store main fragment in the volatile random access memory, create a memory block in the non-volatile random access memory, and copy the column store main fragment from the volatile random access memory to the non-volatile random access memory.

5. The database system according to claim 4, wherein copying the second column store main fragment from the volatile random access memory to the non-volatile random access memory comprises executing an operating system memory copy function, and
   wherein the second column store main fragment that is stored on non-volatile random access memory is byte-addressable.

6. The database system according to claim 4, wherein the second column store main fragment is copied from the volatile random access memory to the non-volatile random access memory without using a filesystem cache.

7. The database system according to claim 1, further comprising:
   wherein the processing unit is to:
   create the second column store main fragment in the volatile random access memory,
   create a block key associated with the second column store main fragment;
   determine an allocation size based on the created second column store main fragment;
   pass the block key and the allocation size to a non-volatile memory block manager,
   receive a pointer from the non-volatile memory block manager; and
   copy the second column store main fragment from the volatile random access memory to the non-volatile random access memory using the pointer.

8. The database system according to claim 1, wherein the processing unit is to create the second column store main fragment in the non-volatile random access memory.

9. The database system according to claim 1, further comprising an access layer to:
   determine whether the second column store main fragment is to be persisted in the non-volatile memory; and
   construct an non-volatile memory (NVM) block key when it is determined the second column store main fragment is to be persisted in NVM, wherein the NVM block key includes a non-volatile memory block ID (NVM-BlockID), and wherein an NVM block to store the second column store main fragment is allocated based on the NVM block key.

10. A computer-implemented method, comprising:
    providing a non-volatile random access memory operative to receive a column store main fragment that is not allocated to a volatile random access memory and initialized from disk;
    storing a column store main fragment of a column of a database table in non-volatile random access memory, wherein the column store main fragment contains all the data stored within the column, wherein the data stored in the column store main fragment is sorted;
    storing a column store delta fragment of the column of the database table in the volatile random access memory, wherein the column store delta fragment contains newly-written data which is not sorted and has not yet been merged into the column store main fragment, wherein the newly-written column store delta fragment data is sorted when contained in a second column store main fragment created by a merger operation;

reading the column store main fragment from the non-volatile random access memory;

executing the merger operation to create the second column store main fragment, wherein the merger operation creates a second empty column store delta fragment operative to receive write operations during the merger operation;

and upon success of the merger operation, logically deleting the column store main fragment and the column store delta fragment from the database table.

11. A method according to claim 10, further comprising:
writing to the column store delta fragment prior to the merger operation, to generate the newly-written column store delta fragment; and
merging, as part of the merger operation, the newly-written column store delta fragment and the column store main fragment into the second column store main fragment.

12. A method according to claim 10, wherein the stored column store main fragment is byte-addressable.

13. A method according to claim 10, further comprising:
creating the second column store main fragment in the volatile random access memory;
creating a memory block in the non-volatile random access memory; and
copying the second column store main fragment from the volatile random access memory to the non-volatile random access memory.

14. A method according to claim 13, wherein copying the second column store main fragment from the volatile random access memory to the non-volatile random access memory comprises executing an operating system memory copy function, and
wherein the stored second column store main fragment is byte-addressable.

15. A method according to claim 13, wherein the second column store main fragment is copied from the volatile random access memory to the non-volatile random access memory without using a filesystem cache.

16. A method according to claim 10, further comprising:
creating the second column store main fragment in the volatile random access memory,
creating a block key associated with the second column store main fragment;
determining an allocation size based on the created second column store main fragment;
passing the block key and the allocation size to a non-volatile memory block manager,
receiving a pointer from the non-volatile memory block manager; and
copying the second column store main fragment from the volatile random access memory to the non-volatile random access memory using the pointer.

17. A non-transitory computer-readable medium storing program code, the program code executable by a computer system to cause the computer system to provide:
a column store engine comprising in-memory representations of a plurality of column store main fragments of a database and a plurality of column store delta fragments of the database, wherein each column store main fragment of the plurality of column store main fragments contains all data stored within a column of the database and the data stored within each of the column store main fragments is sorted, and wherein each column store delta fragment of the plurality of column store delta fragments contains newly-written data which is not sorted and has not yet been merged into the respective column store main fragment, wherein the newly-written data of one of the plurality of column store delta fragments is sorted when contained in a second column store main fragment created by a merger operation;

the non-volatile random access memory is operative to receive one of the plurality of column store main fragments that is not allocated to a volatile random access memory and initialized from disk;

a processing unit to:
read the one of the plurality of the column store main fragments from the non-volatile random access memory,
execute the merger operation to create the second column store main fragment, wherein the merger operation creates a second empty column store delta fragment operative to receive write operations during the merger operation;
and upon success of the merger operation, the one of the plurality of column store main fragments and the one of the plurality of column store delta fragments are logically deleted from the database table;
a memory manager mapping each of the plurality of column store main fragments to a byte-addressable memory location, wherein each of the byte-addressable memory locations is associated with a corresponding block of a non-volatile random access memory.

18. The non-transitory computer-readable medium according to claim 16, wherein the memory manager maps each of the plurality of column store delta fragments to a memory location of a volatile random access memory.

19. The non-transitory computer-readable medium according to claim 17, wherein the column store engine is to create the second column store main fragment in a volatile random access memory, wherein the program code is further executable by a computer system to cause the computer system to: create a memory block, via a non-volatile memory block manager, in the non-volatile random access memory, and wherein the column store engine is to copy the second column store main fragment from the volatile random access memory to the non-volatile random access memory.

20. The non-transitory computer-readable medium according to claim 19, wherein the created second column store main fragment is copied from the volatile random access memory to the non-volatile random access memory without using a filesystem cache.

21. The non-transitory computer-readable medium according to claim 17, wherein the program code is further executable by a computer system to cause the computer system to: create a memory block, via a non-volatile memory block manager, in a non-volatile random access memory, wherein the column store engine is to: create the second column store main fragment in the volatile random access memory, create a block key associated with the second column store main fragment; determine an allocation size based on the created second column store main fragment; pass the block key and the allocation size to the non-volatile memory block manager, receive a pointer from the non-volatile memory block manager; and copy the second column store main fragment from the volatile random access memory to the non-volatile random access memory using the pointer.

\* \* \* \* \*